(12) United States Patent
Hilmi et al.

(10) Patent No.: US 7,524,576 B2
(45) Date of Patent: Apr. 28, 2009

(54) HIGH-LITHIUM ELECTROLYTE FOR USE IN MOLTEN CARBONATE FUEL CELLS AND METHOD FOR MAKING SAME

(75) Inventors: Abdelkader Hilmi, Danbury, CT (US); Chao-Yi Yuh, New Milford, CT (US); Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 430 days.

(21) Appl. No.: 11/130,378

(22) Filed: May 16, 2005

(65) Prior Publication Data

US 2006/0257722 A1    Nov. 16, 2006

(51) Int. Cl.
*H01M 8/14* (2006.01)
*H01M 4/86* (2006.01)

(52) U.S. Cl. ............................. 429/46; 429/40
(58) Field of Classification Search ............ None
See application file for complete search history.

(56) References Cited

U.S. PATENT DOCUMENTS 4,591,538 A    5/1986    Kunz
5,827,495 A *  10/1998   Tomimatsu et al. ......... 423/600
6,890,679 B2   5/2005    Johnsen et al.
2004/0062981 A1 * 4/2004 Friedrich ..................... 429/46

OTHER PUBLICATIONS

H. R. Kunz, Transport of Electrolyte in Molten Carbonate Fuel Cells, J. Electrochem. Soc., vol. 134, p. 105-113 (Jan. 1987).
O.G. Perfil'eva and N.A. Reshetnikov, The Li2CO3-LiOH System, Russian Journal of Inorganic Chemistry, vol. 9, No. 11 (Nov. 1964).
J.B. Goodenough, et al., Some Magnetic and Crystallographic Properties of the System Lix+Ni1-2x++Nix++O+, J. Phys Chem Solids, vol. 5, pp. 107-116, Pergamon Press (1958).

* cited by examiner

*Primary Examiner*—Patrick Ryan
*Assistant Examiner*—Robert Hodge
(74) *Attorney, Agent, or Firm*—Cowan, Liebowitz & Latman, P.C.

(57) ABSTRACT

A high-lithium carbonate electrolyte formed from a eutectic carbonate mixture including lithium carbonate and from an additional lithium-containing component adapted to form lithium carbonate during at least one of initial heat up and operation of the fuel cell.

16 Claims, 2 Drawing Sheets

HIGH-LITHIUM ELECTROLYTE FOR USE IN MOLTEN CARBONATE FUEL CELLS AND METHOD FOR MAKING SAME

BACKGROUND OF THE INVENTION

This invention relates to fuel cells and, in particular, to electrolyte for use in molten carbonate fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Molten carbonate fuel cells (MCFCs) operate by passing a reactant fuel gas through the anode, while oxidizing gas is passed through the cathode. The anode and the cathode of MCFCs are isolated from one another by a porous electrolyte matrix which is saturated with carbonate electrolyte. Typical MCFC designs include carbonate electrolyte stored in the pores of the anode and of the cathode and in gas passages formed in the anode and cathode current collectors. The electrolyte melts during the initial heat up of the fuel cell and redistributes among the pores of the anode, the cathode and the electrolyte matrix due to the capillary forces of the pores. Conventional MCFCs typically use a eutectic carbonate mixture as the carbonate electrolyte, such as a eutectic mixture of 62 mol-% lithium carbonate and 38 mol-% potassium carbonate or a eutectic mixture of 52 mol-% lithium carbonate and 48 mol-% sodium carbonate.

During MCFC operation, the electrolyte in the cells is consumed by corrosive reactions with the cell components, and as a result of evaporation and electrolyte liquid-phase migration. In particular, liquid-phase migration of the electrolyte occurs due to a voltage gradient within the fuel cell stack, which results in migration of lithium and potassium ions along the length of the stack toward a negative end of the stack and of carbonate ions toward a positive end of the stack. Because lithium and potassium ions in the eutectic carbonate electrolyte move at different rates along the stack length, significant variations in lithium to potassium molar ratios occur within the stack. Such variations in the Li/K ratios affect the stability, conductivity and the melting point of the electrolyte within the cells thereby impacting the performance and the lifetime of the MCFC stack.

In order to avoid large variations in the Li/K molar ratios in the stack, an off-eutectic lithium-rich electrolyte mixture has been employed in MCFCs. U.S. Pat. No. 4,591,538 discloses a lithium-rich electrolyte composition consisting of 70-73 molar % of lithium carbonate and 27-30 molar % of potassium carbonate. The use of electrolyte with a greater lithium content, as disclosed in the '538 patent, improves the uniformity of the Li/K ratio in the stack. However, the electrolyte in the '538 patent has a much higher melting point (575° Celsius) as compared with the melting point of the eutectic electrolyte (485-490° Celsius), requiring higher temperatures during the electrode manufacturing process in order to fill the electrodes with electrolyte. The higher temperatures during electrode manufacturing increase shrinkage and cracking of the electrodes, and as a result reduce electrode production yield and significantly increase the manufacturing costs.

It is therefore an object of the present invention to provide an electrolyte in the MCFC electrodes having increased lithium without requiring higher temperatures during the manufacturing process.

It is also an object of the present invention to provide a method of filling the cathode electrodes with electrolyte without affecting the cathode structure.

SUMMARY OF THE INVENTION

In accordance with the principles of the present invention, the above and other objectives are realized in a high-lithium carbonate electrolyte for use in a molten carbonate fuel cell wherein the high-lithium electrolyte is formed from a eutectic carbonate mixture including lithium carbonate and from an additional lithium-containing component adapted to form lithium carbonate during at least one of initial heat up and operation of the fuel cell. The eutectic carbonate mixture of the high-lithium carbonate also includes potassium carbonate or sodium carbonate. The additional component comprises at least one of lithium hydroxide, lithium nitrate, lithium acetate and lithium oxalate and may also comprise a mixture of one or more of these compounds with lithium carbonate. In the illustrative embodiments described, the high-lithium electrolyte is stored in a cathode side of the fuel cell and the additional component reacts with at least one of the components in the oxidizing gas flowing through the cathode side to form lithium carbonate. Particularly, the high-lithium electrolyte is stored in the cathode electrode of the fuel cell.

Also disclosed is a fuel cell assembly comprising a fuel cell having an anode electrode, a cathode electrode and an electrolyte matrix disposed between the anode and the cathode electrodes, and a carbonate electrolyte including the high-lithium electrolyte stored in at least one pre-selected area of the assembly. The fuel cell assembly may also include a cathode current collector, and the high-lithium electrolyte is stored in at least one of the cathode electrode and the cathode current collector. Moreover, the carbonate electrolyte used in the fuel cell assembly may also include a eutectic electrolyte comprising a first eutectic mixture of lithium carbonate and potassium carbonate or a second eutectic mixture of lithium carbonate and sodium carbonate. The eutectic electrolyte is stored in the other pre-selected areas of the assembly. In the illustrative examples disclosed, the high-lithium electrolyte is stored in the cathode electrode while the eutectic electrolyte is stored in the cathode current collector, and the amounts of the high-lithium electrolyte and the eutectic electrolyte are controlled so as to obtain a predetermined composition of the carbonate electrolyte. In particular, such amounts are controlled so that the carbonate electrolyte compositions are one of between 70 and 72 mol-% lithium carbonate and 28-30 mol-% potassium carbonate and 61 mol-% lithium carbonate and 39 mol-% sodium carbonate. Specific examples of storing the high-lithium electrolyte and the eutectic electrolyte are described.

Furthermore, a method of making the fuel cell assembly with a carbonate electrolyte including a high-lithium electrolyte is also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
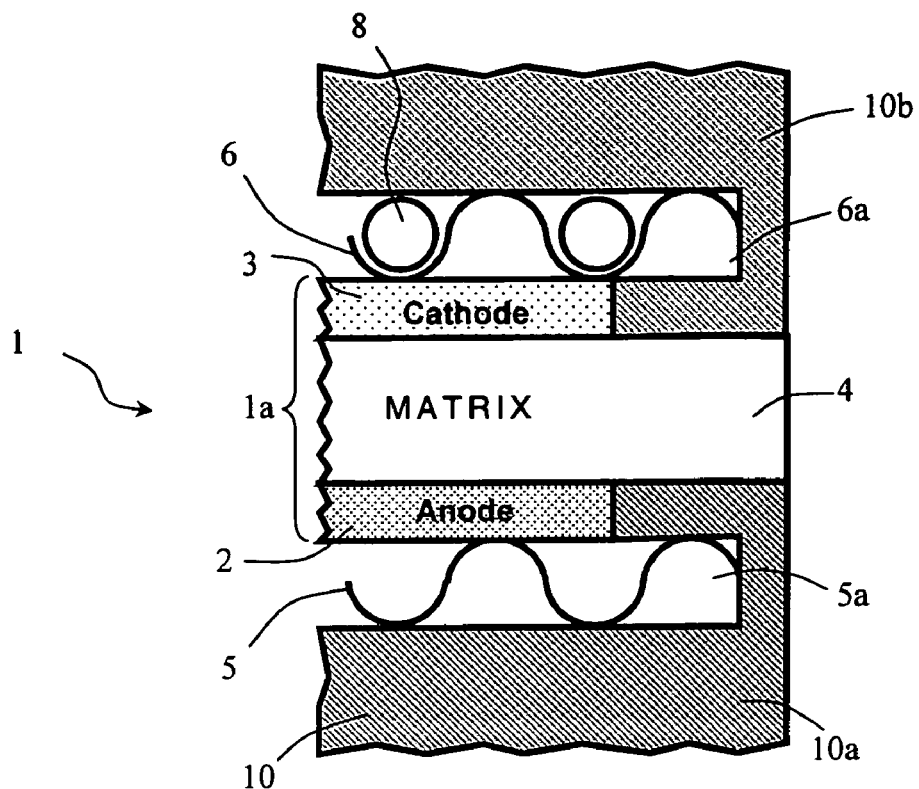
FIG. 1 shows a cross-sectional view of a portion of a fuel cell assembly having fuel cells using a high-lithium electrolyte in accordance with the principles of the present invention.

FIG. 1 shows a cross-sectional view of a portion of a fuel cell assembly 1 which employs a high-lithium electrolyte in accordance with the principles of the present invention. As shown, the fuel cell assembly 1 includes a fuel cell 1a comprising an anode electrode 2 and a cathode electrode 3 separated by an electrolyte matrix 4. The fuel cell 1a also includes an anode current collector 5 and a cathode current collector 6 which form gas passages 5a, 6a for fuel gas and oxidant gas, respectively. In the illustrative example shown in FIG. 1, the anode current collector and the cathode current collector are corrugated current collectors. The fuel cell assembly 1 also includes a plurality of bipolar separator plates 10 for separating adjacent fuel cells of the assembly from one another. In FIG. 1, the bipolar separator plate 10a separates the anode 2 and the anode current collector 5 of the fuel cell 1a from a fuel cell adjacent the anode side of the cell 1a, while the bipolar separator plate 10b separates the cathode 3 and the cathode current collector 6 of the cell 1a from a fuel cell adjacent the cathode side of the cell 1a.

The electrolyte matrix 4 is formed from a porous ceramic material and is saturated with carbonate electrolyte. The anode electrode 2 and the cathode electrode 3 are formed from porous materials. In particular, the anode electrode 2 may be formed from a porous Ni—Al or Ni—Cr—Al material, while the cathode electrode 3 may be formed from a porous sintered NiO material. In addition to being stored in the porous electrolyte matrix 4, the electrolyte may also be stored in the pores of the cathode electrode 3 and/or the anode electrode 2, and in pre-selected passages of the anode and/or cathode current collectors. In the illustrative case shown in FIG. 1, the carbonate electrolyte 8 is stored in the pores of the cathode electrode 3 and in the pre-selected passages of the cathode current collector 6.

The carbonate electrolyte stored in the fuel cell assembly components preferably comprises lithium carbonate ($Li_2CO_3$) and potassium carbonate ($K_2CO_3$) or sodium carbonate ($Na_2CO_3$). The electrolyte includes a high-lithium electrolyte and may also include a eutectic electrolyte. In accord with the invention, the high-lithium electrolyte comprises a eutectic carbonate mixture and an additional lithium-containing component adapted to form lithium carbonate during fuel cell initial heat up and operation. A mixture of 62 mol-% lithium carbonate and 38 mol-% potassium carbonate or a mixture of 52 mol-% lithium carbonate and 48 mol-% potassium carbonate are suitable for use as the eutectic carbonate mixture. The additional lithium-containing component comprises a lithium-containing compound or material having a low melting point, i.e. below about 500° Celsius, which is also preferably capable of forming a second eutectic mixture having a low melting point with the lithium carbonate in the eutectic carbonate mixture. The eutectic electrolyte comprises only the eutectic carbonate mixture without the additional component.

In accord with the invention, the high-lithium electrolyte is stored in pre-selected areas of the fuel cell assembly, while other pre-selected areas of the assembly may be used to store the eutectic electrolyte. In particular, the high-lithium electrolyte and the eutectic electrolyte are each stored in pre-selected components of the fuel cell assembly. During the initial heat up, or start up, and operation of the assembly, the additional component in the high-lithium electrolyte forms lithium carbonate, and both the high-lithium electrolyte and the eutectic electrolyte melt and redistribute among the pores of the electrolyte matrix, the cathode electrode and the anode electrode. This results in an increase of the overall lithium carbonate concentration of the electrolyte stored in the assembly. The final overall composition of the electrolyte in the fuel cell assembly may be controlled by varying the amount of the additional component in the high-lithium electrolyte relative to the total amount of the eutectic carbonate mixture in the high-lithium electrolyte and the eutectic electrolyte.

In the illustrative arrangement shown in FIG. 1, the high-lithium electrolyte is stored in the cathode electrode 3 and may also be stored in the pre-selected passages of the cathode current collector 6, while the eutectic electrolyte is stored in the other components of the assembly such as the electrolyte matrix 4 and the anode side, i.e. anode electrode 2 and/or anode current collector 5, of the fuel cell 1a. In the illustrative examples described herein below, the additional lithium component in the high-lithium electrolyte is lithium hydroxide (LiOH). Lithium hydroxide has a melting point of 470° Celsius and is capable of forming a second eutectic mixture with lithium carbonate having a melting point between 440 and 445° Celsius. Other lithium-containing compounds such as lithium nitrate ($LiNO_3$), lithium acetate ($LiC_2H_3O_2$) and lithium oxalate ($Li_2C_2O_4$) are suitable for use as the additional lithium component of the high-lithium electrolyte. In addition, the additional component may also comprise a mixture of these compounds with lithium carbonate.

During the initial heat up and operation of the fuel cell assembly, fuel gas is passed through the anode side of the fuel cell 1a, while oxidant gas is passed through the cathode side. The additional component in the high-lithium electrolyte stored in the cathode side of the cell reacts with one or more components of the oxidant gas to form additional lithium carbonate. In particular, the additional component reacts with the carbon dioxide in the oxidizing gas to produce lithium carbonate and water. When lithium hydroxide is used as the additional component of the high-lithium electrolyte, lithium hydroxide reacts with carbon dioxide in the oxidizing gas as follows:

$$2LiOH + CO_2 \rightarrow Li_2CO_3 + H_2O \qquad (1)$$

By way of this reaction, the overall concentration of lithium carbonate in the fuel cell and the ratio of lithium to potassium are increased.

As mentioned above, cathode electrode 3 of the fuel cell 1a stores the high-lithium electrolyte in its pores, while the cathode current collector 6 stores the high-lithium electrolyte in pre-selected passages formed by the current collector. The cathode electrode 3 is formed from nickel powder by any suitable conventional technique such as dry doctoring and sintering, and then filled with predetermined amounts of the eutectic carbonate mixture and the additional lithium component. The pre-selected passages of the cathode current collector store additional predetermined amounts of the eutectic mixture and the additional component.

Alternatively, the cathode electrode may store all the high-lithium electrolyte. In such case, the cathode current collector stores the eutectic electrolyte.

The amounts of high-lithium electrolyte and eutectic electrolyte stored in the cathode and the cathode current collector are predetermined so as to form an electrolyte having a predetermined composition, and in particular, a predetermined lithium carbonate concentration. In the illustrative examples provided below, the cathode electrode 3 and the cathode current collector 6 of the fuel cell assembly are filled so as to form an electrolyte with a final composition of 70-72 mol-% lithium carbonate and 28-30 mol-% of potassium carbonate or 61 mol-% lithium carbonate and 39 mol-% sodium carbonate.

EXAMPLE 1

In this illustrative example, the fuel cell 1a of the fuel cell assembly 1 includes a porous Ni—Al anode 2 and a porous NiO cathode electrode 3, separated by a porous ceramic electrolyte matrix formed from $LiAlO_2$. The cathode electrode 3 comprises a porous in-situ oxidized and lithiated NiO material and has a surface area of approximately 250 $cm^2$. The cathode electrode is filled with the high-lithium electrolyte comprising 17.8 grams of the eutectic carbonate mixture of 62 mol-% lithium carbonate and 38 mol-% potassium carbonate and 3.7 grams of lithium hydroxide.

The fuel cell 1a also includes an anode current collector 5 adjacent the anode electrode 2 and a cathode current collector 6 adjacent the cathode electrode. As described above, the cathode current collector forms gas passages, with pre-selected passages being filled with the eutectic carbonate electrolyte. In this illustrative example, the pre-selected passages of the cathode current collector 6 are filled with 12 grams of the eutectic electrolyte, which comprises a eutectic mixture of 62 mol-% lithium carbonate and 38 mol-% potassium carbonate.

When the fuel cell 1a of this example is being initially heated up or operated, oxidizing gas is passed through the cathode electrode 3. Lithium hydroxide in the high-lithium electrolyte stored in the cathode electrode 3 reacts with carbon dioxide in the oxidizing gas as shown above in reaction (1) to produce lithium carbonate. In this way, the high-lithium electrolyte composition in the cathode electrode 3 becomes 73.4 mol-% lithium carbonate and 26.6 mol-% potassium carbonate. When the eutectic electrolyte in the cathode current collector 6 melts and is combined with this high-lithium electrolyte in the cathode electrode 3, the final composition of the carbonate electrolyte in the fuel cell 1a becomes 70 mol-% lithium carbonate and 30 mol-% potassium carbonate.

Fuel cell cathodes and cathode current collectors formed and filled as described in the above Example 1 were tested in single cells. During these tests, fuel gas comprising 72.8% $H_2$, 18.2% $CO_2$ and 9% $H_2O$ was passed through the anode side of the fuel cells, while oxidant gas comprising 18.5% $CO_2$, 12.1% $O_2$, 66.4% $N_2$ and 3% $H_2O$ was passed through the cathode side of the cells. The current density during the tests was about 160 $mA/cm^2$ and the fuel utilization rate was approximately 75%.

Figure 2:
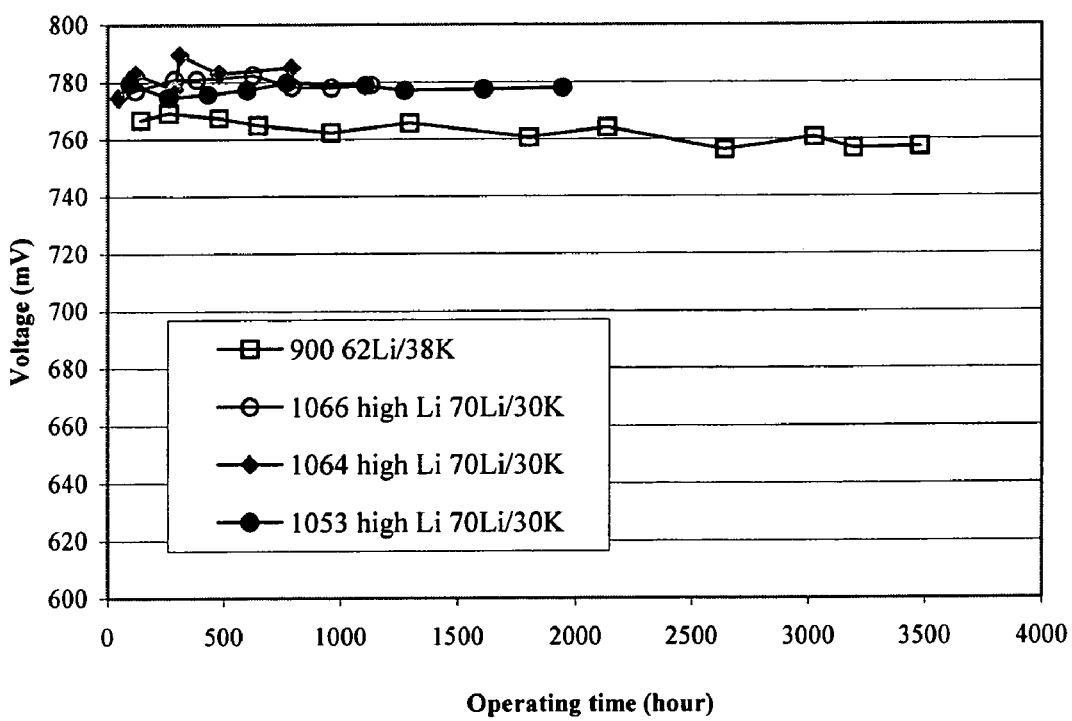
FIG. 2 shows a graph of performance data of the fuel cells of FIG. 1 and of conventional fuel cells using a eutectic electrolyte.

FIG. 2 shows a graph of performance data of the fuel cells having cathode electrodes filled with the high-lithium electrolyte as described in Example 1 and of the fuel cells filled with the conventional electrolyte comprising the eutectic mixture of 62 mol-% lithium carbonate and 38 mol-% potassium carbonate. As shown, voltage produced by the fuel cells with the high-lithium electrolyte was approximately 10-14 mV higher than the voltage produced by the fuel cells filled with the eutectic electrolyte. According to the results shown, the voltage produced by the conventional fuel cells was between 758 and 768 mV, while the voltage produced by the fuel cells with the high-lithium electrolyte was between 777 and 790 mV. This improvement in performance is attributed to a higher ionic conductivity of the high-lithium electrolyte, which results in an 18% decrease in internal resistance in the cells. Use of the high-lithium electrolyte also results in lower cathode polarization due to a higher surface area of the cathode and higher solubility of oxygen in the melted electrolyte.

Fuel cell cathodes filled with high-lithium electrolyte as described in Example 1 were also tested in button cells. The cathodes tested in these button cell tests had a surface area of 3 $cm^2$ and were filled with 227 mg of the eutectic carbonate, i.e. 62 mol-% lithium carbonate and 38 mol-% potassium carbonate mixture, and 47 mg of lithium hydroxide. The testing was performed at 160 $mA/cm^2$ current density and low utilization of about 5%. The performance data for the cells tested was compared with the performance data for conventional button cells filled with the eutectic electrolyte. The voltage produced by the cells with the high-lithium electrolyte was approximately 14-18 mV higher than the voltage produced by the conventional button cells.

In addition, cathode dissolution was measured in cathode electrodes filled with high-lithium electrolyte prepared in accordance with Example 1. The testing of the cathode electrodes was conducted in single cells at 160 $mA/cm^2$ current density and 75% utilization. The amount of Ni deposited in the electrolyte matrix of the cell during the operation of the single cells was measured over a period of time. Conventional cathodes filled with the eutectic electrolyte were tested under similar conditions.

Figure 3:
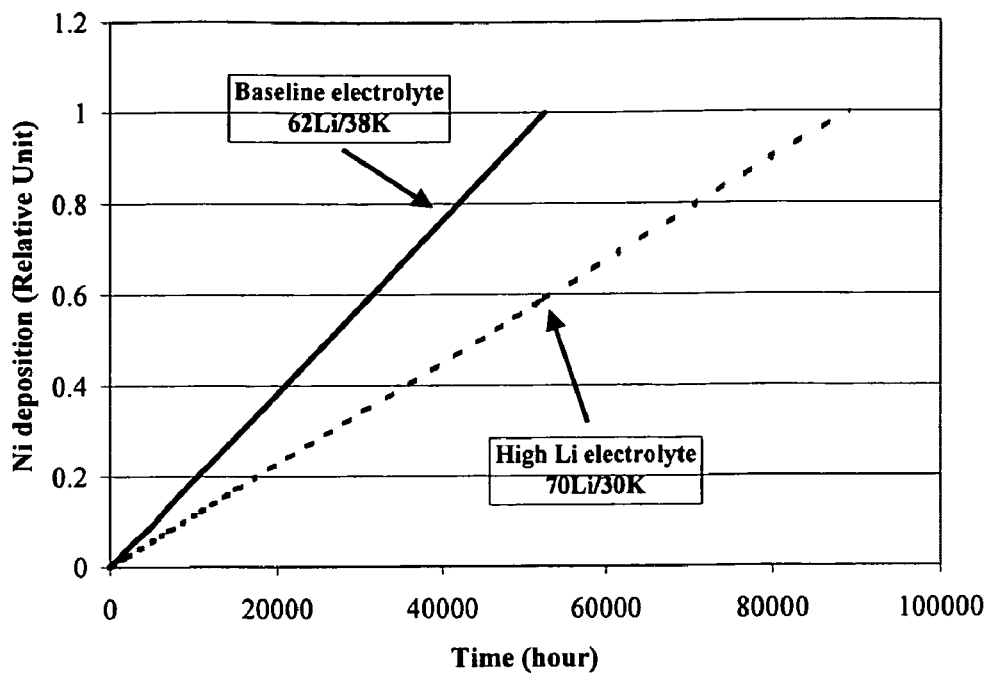
FIG. 3 shows a graph of cathode dissolution data of the fuel cells of FIG. 1 and of conventional fuel cells.

FIG. 3 shows a graph of cathode dissolution data for cathodes filled with high-lithium electrolyte as described in Example 1 and for conventional cathodes filled with eutectic electrolyte. In FIG. 3, the X-axis represents the fuel cell operation time in hours, while the Y-axis represents relative Ni deposition in the electrolyte matrix, where relative unit 1 corresponds to approximately 24 $mg/cm^2$ of Ni deposited in the matrix. As can be appreciated, the amount of Ni deposited in the electrolyte matrix is directly related to dissolution of the cathode electrode.

As shown in FIG. 3, Ni deposition rate in the matrix of the conventional fuel cells was significantly higher than in the matrix of the fuel cells with the high-lithium electrolyte. For example, after about 40,000 hours of operation, the relative amount of Ni deposited in the matrix in fuel cells with the high-lithium electrolyte was about 0.45, while the relative amount of Ni deposited in the matrix in conventional fuel cells was approximately 0.75. After about 52,000 hours of operation, the amount of Ni deposited in the electrolyte matrix of conventional fuel cells was about 1, or 24 $mg/cm^2$, while the amount of Ni deposited in the matrix of fuel cells with the high-lithium electrolyte was about 0.6, or 14.4 $mg/cm^2$. The lower Ni dissolution rate in the cells using the cathode electrode filled with high-lithium electrolyte is due to the higher pH of the lithium-rich electrolyte as compared to the pH of the eutectic electrolyte. Such decrease in Ni dissolution is responsible for a substantial increase in the lifetime of the fuel cells and fuel cell stacks with the high-lithium electrolyte.

EXAMPLE 2

In this illustrative example, the cathode electrode 3 is filled with high-lithium electrolyte and the cathode current collector 6 is filled with the eutectic electrolyte such that the final electrolyte composition in the fuel cell 1a is 72 mol-% lithium carbonate and 28 mol-% potassium carbonate. The fuel cell used in this example is a button cell having the arrangement and components similar to those described in Example 1. The cathode electrode has a surface area of 3 $cm^2$ and is filled with the high-lithium electrolyte comprising 195 mg of the eutectic carbonate mixture of 62 mol-% lithium carbonate and 38 mol-% potassium carbonate and with 68 mg of lithium hydroxide. The pre-selected passages of the cathode current collector are filled with an appropriate amount of the eutectic Li/K electrolyte. In this example, the pre-selected passages of the cathode current collector are filled with approximately 219 mg of the eutectic electrolyte. During the initial heat up and operation of the fuel cell, oxidizing gas comprising carbon dioxide is passed through the cathode electrode and the lithium hydroxide in the high-lithium electrolyte reacts with carbon dioxide to produce lithium carbonate electrolyte via the reaction (1) shown above. By way of this reaction, the overall concentration of lithium carbonate in the electrolyte is increased to 72 mol-% lithium carbonate.

The performance of fuel cells using cathodes filled with high-lithium electrolyte as described in Example 2 was tested in button cells and compared with the performance of conventional fuel cells. In particular, cell resistance of the fuel cells was tested in cells with the electrolyte having a final concentration of 72 mol-% lithium carbonate and 28 mol-% potassium carbonate and in cells using the conventional eutectic electrolyte, i.e. 62 mol-% lithium carbonate and 38 mol-% potassium carbonate.

Figure 4:
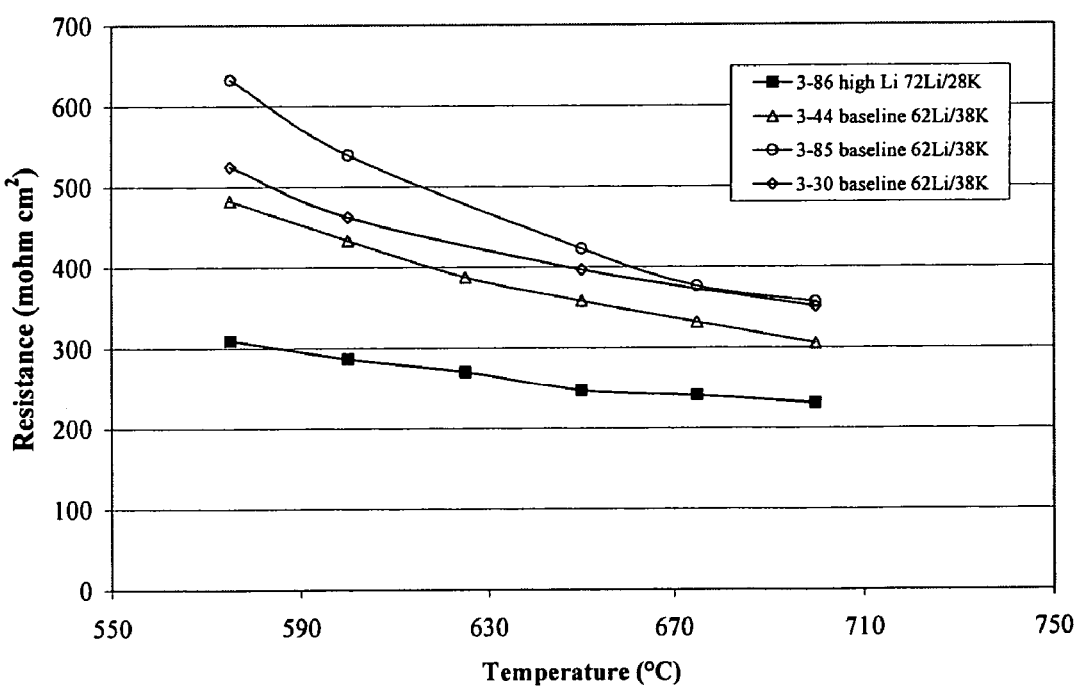
FIG. 4 shows a graph of cell resistance data of the fuel cells in FIG. 1 and of conventional fuel cells.

FIG. 4 shows a graph of the cell resistance data of the button cells tested. In FIG. 4, the X-axis represents the temperature in the fuel cells tested during these tests, while the Y-axis represents the measured cell resistance of the cells in mohm-cm$^2$. As shown, the cell resistance in the fuel cells with the high-lithium electrolyte was substantially lower at fuel cell operating temperatures between 575 and 700° C. than the cell resistance in the fuel cells with the eutectic electrolyte. Specifically, the cell resistance in the fuel cells with high-lithium electrolyte ranged between approximately 300 mohm-cm$^2$ at 575° C. and 230 mohm-cm$^2$ at 700° C. In conventional fuel cells using the eutectic electrolyte, the cell resistance was between 480 and 630 mohm-cm$^2$ at 575° C. and between 300 and 350 mohm-cm$^2$ at 700° C. The lower resistance in the fuel cells using high-lithium electrolyte results in higher ionic conductivity and in higher voltage being produced by the cells. Moreover, the higher conductivity in these fuel cells improves the uniformity of current and thermal distributions in the cells and lowers the fuel cell stack temperature.

EXAMPLE 3

In this illustrative example, fuel cells using the cathode electrode filled with the high-lithium electrolyte comprising lithium carbonate and sodium carbonate are described. The fuel cell 1a in this example has the same dimensions as the button cells described above in Example 2. The cathode electrode is filled with high-lithium electrolyte which comprises a eutectic Li/Na carbonate mixture of 52 mol-% lithium carbonate and 48% sodium carbonate and the additional component comprising lithium hydroxide. In particular, the cathode electrode is filled with 207 mg of the eutectic Li/Na carbonate mixture and 47 mg of lithium hydroxide. The pre-selected passages of the cathode current collector 6 of the fuel cell 1a are filled with 216 mg of the eutectic Li/Na electrolyte, i.e. mixture of 52 mol-% lithium carbonate and 48 mol-% sodium carbonate. When the lithium hydroxide in high-lithium electrolyte stored in the cathode electrode reacts with carbon dioxide in the oxidizing gas during the fuel cell initial heat up and operation, additional lithium carbonate is produced. The composition of the high-lithium electrolyte in the cathode electrode is 66 mol-% lithium carbonate and 34 mol-% sodium carbonate. When this high-lithium electrolyte composition is combined with the eutectic electrolyte stored in the cathode current collector, the final composition of the electrolyte in the fuel cell becomes 61 mol-% lithium carbonate and 39 mol-% sodium carbonate. The voltage produced by the fuel cells with high lithium electrolyte in this example is approximately 30 mV higher than the voltage produced by the conventional button cells using the eutectic mixture of 52 mol-% lithium carbonate and 48 mol-% sodium carbonate.

EXAMPLE 4

This example discloses another high-lithium electrolyte composition which can be used to fill the cathode electrode and/or the current collector 6 of the fuel cell 1a so as to achieve the electrolyte having a higher lithium carbonate concentration. In this example, the additional component of the high-lithium electrolyte comprises a mixture of lithium carbonate and lithium hydroxide. In this illustrative example, the additional component comprises a mixture of 20-30 mol-% of lithium carbonate and 70-80 mol-% of lithium hydroxide. The cathode electrode and/or the pre-selected passages of the cathode current collector are filled with appropriate amounts of the eutectic electrolyte mixture and the additional component so that the total electrolyte in the fuel cell has a predetermined concentration of lithium carbonate and a predetermined molar ratio of lithium to potassium.

In this illustrative example, the cathode electrode with a surface area of 250 cm$^2$ is filled at low temperatures, i.e. less than 530° C., with 17.6 g of pre-melted eutectic Li/K carbonate mixture and 5.6 g of pre-melted additional component comprising 20 mol-% of lithium carbonate and 80 mol-% lithium hydroxide. The pre-selected passages of the cathode current collector are filled with 12 g of the eutectic Li/K electrolyte. With this arrangement, the resulting composition of the total electrolyte in the fuel cell is 72 mol-% lithium carbonate and 28 mol-% potassium carbonate.

The performance of the cathode electrodes filled with the high-lithium electrolyte in accordance with Example 4 was tested in single cells at 160 mA/cm$^2$ current density, 650° C. temperature and 75% utilization. The voltage produced in these single cells was between 10 and 14 mV higher than the voltage produced in conventional cells using the eutectic electrolyte.

Fuel cells using cathode electrodes filled with high-lithium electrolyte as described in the above examples also showed improvement in stability. Such improvement is attributed in part to a more uniform molar ratio of lithium ions to potassium ions in the Li/K carbonate electrolyte and of lithium ions to sodium ions in the Li/Na carbonate electrolyte, which reduces electrolyte loss by migration. The improvement in stability as well as the reduced Ni dissolution in fuel cells with the high-lithium electrolyte, as discussed above, result in a significant extension of the fuel cell operating life. For example, the operating life of the fuel cells using the high-lithium electrolyte and having an overall electrolyte composition comprising 72 mol-% lithium carbonate and 28 mol-% potassium carbonate is approximately 45% greater than the operating life of the conventional fuel cells using only the eutectic electrolyte. Also, the operating life of the fuel cells with the overall electrolyte composition of 61 mol-% lithium carbonate and 39 mol-% sodium carbonate doubled as compared to the operating life of the conventional cells using the eutectic electrolyte composition, i.e. 52 mol-% lithium carbonate and 48 mol-% sodium carbonate.

In all cases it is understood that the above-described arrangements are merely illustrative of the many possible specific embodiments which represent applications of the present invention. Numerous and varied other arrangements, including use of different materials and various configurations of components of the manifold assembly, can be readily devised in accordance with the principles of the present invention without departing from the spirit and scope of the invention. For example, although not described in the specific examples provided above, the high-lithium electrolyte may be stored in the passages of the cathode current collector in addition to the cathode electrode, or only in the cathode current collector and not in the cathode electrode. Moreover, the anode electrode or the pre-selected passages of the anode current collector, or both, may be filled with the high-lithium electrolyte comprising a suitable additional lithium-containing component so as to increase the lithium carbonate concentration in the carbonate electrolyte.

We claim:

1. A high-lithium carbonate electrolyte for use in a molten carbonate fuel cell comprising:
    a eutectic carbonate mixture including lithium carbonate; and
    an additional lithium-containing component adapted to form lithium carbonate during at least one of an initial heat up and operation of the molten carbonate fuel cell;
    wherein said eutectic carbonate mixture includes one of potassium carbonate and sodium carbonate;
    wherein said high-lithium carbonate electrolyte is adapted to be stored in a cathode side of said molten carbonate fuel cell, and wherein said additional component is adapted to react with at least one component of an oxidizing gas flowing through said cathode side to form lithium carbonate; and
    wherein said additional component comprises between 20 and 30 mol-% lithium carbonate and between 70 and 80 mol-% lithium hydroxide.

2. A high-lithium carbonate electrolyte in accordance with claim 1
    wherein said cathode side comprises at least a cathode electrode and said high-lithium electrolyte is adapted to be stored in said cathode electrode.

3. A fuel cell assembly comprising:
    a fuel cell including an anode electrode, a cathode electrode and an electrolyte matrix disposed between said anode electrode and said cathode electrode;
    a carbonate electrolyte stored in said fuel cell assembly, said carbonate electrolyte including a high-lithium electrolyte stored in at least a pre-selected area of said fuel cell assembly;
    wherein said high-lithium electrolyte comprises: a eutectic carbonate mixture including lithium carbonate; and an additional lithium-containing component adapted to form lithium carbonate during at least one of an initial heat up and operation of said fuel cell;
    wherein said eutectic carbonate mixture further includes one of potassium carbonate and sodium carbonate;
    wherein said additional component of said high-lithium electrolyte comprises at least one of lithium hydroxide, lithium nitrate, lithium acetate and lithium oxalate;
    wherein said high-lithium electrolyte is stored in said cathode electrode of said fuel cell and wherein said additional component of said high-lithium electrolyte is adapted to react with at least one component of an oxidizing gas flowing through said cathode electrode to form lithium carbonate; and
    wherein said carbonate electrolyte further includes a eutectic electrolyte stored in other pre-selected areas of said assembly, said eutectic electrolyte comprising eutectic mixture of 52 mol-% lithium carbonate and 48 mol-% sodium carbonate.

4. A fuel cell assembly in accordance with claim 3, wherein said assembly further comprises a cathode current collector disposed adjacent said cathode electrode, said cathode current collector being adapted to store one of said high-lithium electrolyte and said eutectic electrolyte.

5. A fuel cell assembly in accordance with claim 4, wherein:
    said cathode electrode stores a predetermined amount of said high-lithium electrolyte including a first amount of said eutectic carbonate mixture and a second amount of said additional component;
    said cathode current collector stores a third amount of said eutectic electrolyte; and
    said first amount, said second amount and said third amount being controlled so as to obtain a predetermined composition of said carbonate electrolyte.

6. A fuel cell assembly in accordance with claim 5, wherein said predetermined composition of said carbonate electrolyte is one of between 70 and 72 mol-% lithium carbonate and 28-30 mol-% potassium carbonate, and 61 mol-% lithium carbonate and 39 mol-% sodium carbonate.

7. A fuel cell assembly in accordance with claim 4, wherein said additional component further comprises lithium carbonate.

8. A fuel cell assembly in accordance with claim 7, wherein said additional component comprises between 20 and 30 mol-% lithium carbonate and between 70 and 80 mol-% lithium hydroxide.

9. A method of making a fuel cell assembly with a carbonate electrolyte having an increased lithium carbonate concentration, said method comprising:
    providing a fuel cell including an anode electrode, a cathode electrode and an electrolyte matrix disposed between said anode electrode and said cathode electrode;
    providing a carbonate electrolyte and storing said carbonate electrolyte in said fuel cell assembly, said carbonate electrolyte including a high-lithium electrolyte stored in at least a pre-selected area of said fuel cell assembly;
    wherein said high-lithium electrolyte comprises: a eutectic carbonate mixture including lithium carbonate; and an additional lithium-containing component adapted to form lithium carbonate during at least one of an initial heat up and operation of said fuel cell;
    wherein said eutectic carbonate mixture further includes one of potassium carbonate and sodium carbonate;
    wherein said additional component of said high-lithium electrolyte comprises at least one of lithium hydroxide, lithium nitrate, lithium acetate and lithium oxalate;
    wherein said high-lithium electrolyte is stored in said cathode electrode of said fuel cell and wherein said additional component of said high-lithium electrolyte is adapted to react with at least one component of an oxidizing gas flowing through said cathode electrode to form lithium carbonate; and
    wherein said carbonate electrolyte further includes a eutectic electrolyte stored in other pre-selected areas of said assembly, said eutectic electrolyte comprising eutectic mixture of 52 mol-% lithium carbonate and 48 mol-% sodium carbonate.

10. A method of making a fuel cell assembly in accordance with claim 9, wherein
    said cathode electrode stores a predetermined amount of said high-lithium electrolyte including a first amount of said eutectic carbonate mixture and a second amount of said additional component;

said cathode current collector stores a third amount of said eutectic electrolyte; and said first amount, said second amount and said third amount being controlled so as to obtain a predetermined composition of said carbonate electrolyte; and wherein said predetermined composition of said carbonate electrolyte is one of between 70 and 72 mol-% lithium carbonate and 28-30 mol-% potassium carbonate, and 61 mol-% lithium carbonate and 39 mol-% sodium carbonate.

11. A method of making a fuel cell in accordance with claim 9, further comprising:

at least one of initially heating up and operating said assembly so that said high-lithium electrolyte and said eutectic carbonate electrolyte combine to form said carbonate electrolyte having a desired composition.

12. A method of making a fuel cell assembly comprising:

providing a molten carbonate fuel cell including an anode electrode, a cathode electrode and an electrolyte matrix disposed between said anode electrode and said cathode electrode;

providing a carbonate electrolyte and storing said carbonate electrolyte in said molten carbonate fuel cell, said carbonate electrolyte including a high-lithium carbonate electrolyte stored in at least a pre-selected area of said molten carbonate fuel cell;

wherein said high-lithium carbonate electrolyte comprises: a eutectic carbonate mixture including lithium carbonate; and an additional lithium-containing component adapted to form lithium carbonate during at least one of initial heat up and operation of said molten carbonate fuel cell; and wherein said eutectic carbonate mixture further includes one of potassium carbonate and sodium carbonate;

wherein said high-lithium carbonate electrolyte is stored in a cathode side of said molten carbonate fuel cell and wherein said additional component is adapted to react with at least one component of an oxidizing gas flowing through said cathode side to form lithium carbonate; and wherein said additional component comprises between 20 and 30 mol-% lithium carbonate and between 70 and 80 mol-% lithium hydroxide.

13. A method of making a fuel cell assembly in accordance with claim 12, further comprising:

providing a eutectic electrolyte comprising a eutectic carbonate mixture including one of a first eutectic mixture comprising 62 mol-% lithium carbonate and 38 mol-% potassium carbonate and a second eutectic mixture comprising 52 mol-% lithium carbonate and 48 mol-% sodium carbonate; and storing said eutectic electrolyte in other pre-selected areas of said assembly.

14. An assembly comprising:

a cathode side molten carbonate fuel cell component; and a high-lithium carbonate electrolyte stored in said cathode side molten carbonate fuel cell component, said high-lithium carbonate electrolyte comprising: a eutectic carbonate mixture including lithium carbonate; and an additional lithium-containing component adapted to form lithium carbonate during at least one of initial heat up and operation of a molten carbonate fuel cell employing said cathode side molten carbonate fuel cell component;

wherein said eutectic carbonate mixture includes one of potassium carbonate and sodium carbonate;

wherein said high-lithium carbonate electrolyte is adapted to be stored in a cathode side of said molten carbonate fuel cell, and wherein said additional component is adapted to react with at least one component of an oxidizing gas flowing through said cathode side to form lithium carbonate; and wherein said additional component comprises between 20 and 30 mol-% lithium carbonate and between 70 and 80 mol-% lithium hydroxide.

15. An assembly in accordance with claim 14, wherein said molten carbonate fuel cell component is one or more of a cathode electrode and a cathode current collector.

16. A fuel cell assembly comprising:

a molten carbonate fuel cell including an anode electrode, a cathode electrode and an electrolyte matrix disposed between said anode electrode and said cathode electrode;

a carbonate electrolyte stored in said molten carbonate fuel cell, said carbonate electrolyte including a high-lithium carbonate electrolyte stored in at least a pre-selected area of said molten carbonate fuel cell;

wherein said high-lithium electrolyte comprises: a eutectic carbonate mixture including lithium carbonate; and an additional lithium-containing component adapted to form lithium carbonate during at least one of an initial heat up and operation of said molten carbonate fuel cell;

wherein said eutectic carbonate mixture further includes one of potassium carbonate and sodium carbonate;

wherein said high-lithium carbonate electrolyte is stored in a cathode side of said molten carbonate fuel cell and wherein said additional component of said high-lithium electrolyte is adapted to react with at least one component of an oxidizing gas flowing through said cathode side to form lithium carbonate; and wherein said additional component comprises between 20 and 30 mol-% lithium carbonate and between 70 and 80 mol-% lithium hydroxide.

* * * * *